(12) United States Patent
Preisler et al.

(10) Patent No.: US 11,772,460 B2
(45) Date of Patent: Oct. 3, 2023

(54) ANTIMICROBIAL, INJECTION MOLDED AIR DUCT FOR USE IN AN AIR DISTRIBUTION SYSTEM

(71) Applicant: JVIS-USA, LLC, Shelby Township, MI (US)

(72) Inventors: Darius J. Preisler, Macomb, MI (US); Jason T. Murar, Macomb, MI (US); Shawn R. Williams, Auburn Hills, MI (US)

(73) Assignee: JVIS-USA, LLC, Shelby Township, MI (US)

( * ) Notice: Subject to any disclaimer, the term of this patent is extended or adjusted under 35 U.S.C. 154(b) by 100 days.

(21) Appl. No.: 17/012,822

(22) Filed: Sep. 4, 2020

(65) Prior Publication Data

US 2022/0072935 A1    Mar. 10, 2022

(51) Int. Cl.
 *B60H 3/00* (2006.01)
 *B60H 1/00* (2006.01)

(52) U.S. Cl.
 CPC ....... *B60H 3/0092* (2013.01); *B60H 1/00564* (2013.01)

(58) Field of Classification Search
 CPC .......... B60H 3/0092; B60H 1/00564; B60H 3/0085; F24F 8/20; F24F 8/24; B01D 2239/0442
 See application file for complete search history.

(56) References Cited

U.S. PATENT DOCUMENTS

| | | | | |
|---|---|---|---|---|
| 10,065,479 | B1 * | 9/2018 | Stander | B60H 1/00521 |
| 10,710,427 | B2 * | 7/2020 | Bullock | B62D 25/06 |
| 2016/0229265 | A1 | 8/2016 | Sawyer | |
| 2019/0168575 | A1 * | 6/2019 | Perez | |
| 2019/0352446 | A1 * | 11/2019 | Vontorcik, Jr. | C08G 18/6674 |

FOREIGN PATENT DOCUMENTS

| | | | | |
|---|---|---|---|---|
| JP | H10272738 A | * | 10/1998 | |
| KR | 20060124322 A | * | 12/2006 | |
| WO | WO-9959832 A1 | * | 11/1999 | B60H 1/3233 |

OTHER PUBLICATIONS

English Translation of JPH10272738A, dated Jan. 11, 2022 (Year: 2022).*
English Translation of JPH10272738A Abstract, dated Jan. 11, 2022 (Year: 2022).*
English Translation of WO-9959832-A1, dated Jun. 21, 2022 (Year: 2022).*
English Translation of KR-20060124322-A, dated Jul. 13, 2023 (Year: 2023).*

* cited by examiner

*Primary Examiner* — Edelmira Bosques
*Assistant Examiner* — Brett Peterson Mallon
(74) *Attorney, Agent, or Firm* — Brooks Kushman P.C.

(57) ABSTRACT

An antimicrobial, injection molded air duct for use in an air distribution system which delivers air to a passenger cabin of a vehicle or into an enclosed space within a residential structure is provided. The air duct includes a hollow, injection molded housing having an air passageway for communicating airflow therethrough. The housing includes a layer of molded material which at least partially defines the passageway and which absorbs airborne liquid droplets containing infectious, disease-causing pathogens moving with the airflow. The molded material includes antimicrobial agents disbursed throughout the layer to reduce the number of pathogens contained within droplets absorbed by the layer.

17 Claims, 4 Drawing Sheets

ANTIMICROBIAL, INJECTION MOLDED AIR DUCT FOR USE IN AN AIR DISTRIBUTION SYSTEM

CROSS-REFERENCE TO RELATED APPLICATION

This application is related to U.S. patent application Ser. No. 17/012,786, entitled "Antimicrobial, Injection Molded Air Register for Use in an Air Distribution System," filed Sep. 4, 3030 on the same day as this application.

TECHNICAL FIELD

At least one embodiment of the present invention generally relates to air ducts for use in air distribution systems, and, in particular, to such air ducts which are injection molded.

OVERVIEW

To maintain an active infectious disease in a human population, a pathogen must be transmitted from one host or source to another. Transmission occurs by four main routes: airborne, contact, vehicle, and vector-borne.

Airborne Transmission

Because air is not a suitable medium for the growth of a pathogen, any pathogen that is airborne must have originated from a source such as humans, other animals, plants, soil, food, or water. In airborne transmission the pathogen is truly suspended in the air and travels over a meter or more from the source to the host. The pathogen can be contained within droplet nuclei or dust. Droplet nuclei are small particles, 1 to 4 μm in diameter, that result from the evaporation of larger particles (10 μm or more in diameter) called droplets. Droplet nuclei can remain airborne for hours or days and travel long distances.

When animals or humans are the source of the airborne pathogen, it usually is propelled from the respiratory tract into the air by an individual's coughing, sneezing, or vocalization.

Aerosols and droplets generated during speech have been implicated in the person-to-person transmission of viruses, and there is current interest in understanding the mechanisms responsible for the spread of Covid-19 by these means. The act of speaking generates oral fluid droplets that vary widely in size, and these droplets can harbor infectious virus particles. Whereas large droplets fall quickly to the ground, small droplets can dehydrate and linger as "droplet nuclei" in the air, where they behave like an aerosol and thereby expand the spatial extent of emitted infectious particles.

The table immediately below summarizes some human airborne pathogens and the diseases they cause in humans.

| Microorganism | Disease |
| --- | --- |
| Viruses | |
| Varicella | Chickenpox |
| Influenza | Flu |
| Rubeola | Measles |
| Rubella | German measles |
| Mumps | Mumps |
| Poliomyelitis | Polio |
| Acute respiratory viruses | Viral pneumonia |
| Pulmonary syndrome hantavirus | Hantavirus pulmonary syndrome |

| Microorganism | Disease |
| --- | --- |
| Bacteria | |
| *Actinomyces* spp. | Lung infections |
| *Bordetella pertussis* | Whooping cough |
| *Chlamydia psittaci* | Psittacosis |
| *Corynebacterium diphtheriae* | Diphtheria |
| *Mycoplasma pneumoniae* | Pneumonia |
| *Mycobacterium tuberculosis* | Tuberculosis |
| *Neisseria meningitidis* | Meningitis |
| *Streptococcus* spp. | Pneumonia, sore throat |
| Fungi | |
| *Blastomyces* spp. | Lung infections |
| *Coccidioides* spp. | Coccidioidomycosis |
| *Histoplasma capsulatum* | Histoplasmosis |

Ducts are conduits or passages used in heating, ventilation, and air conditioning (HVAC) to deliver and remove air. The needed airflows include, for example, supply air, return air, and exhaust air. Ducts commonly also deliver ventilation air as part of the supply air. As such, air ducts are one method of ensuring acceptable indoor air quality as well as thermal comfort. A duct system is also called ductwork.

Duct systems often provide a method of adjusting the volume of air flow to various parts of the system. Volume control dampers provide this function. Besides the regulation provided at registers or diffusers that spread air into individual rooms, dampers can be fitted within the ducts themselves. These dampers may be manually or automatically operated.

Turning vanes are installed inside of ductwork at changes of direction (e.g. at 90° turns) in order to minimize turbulence and resistance to the air flow. The vanes guide the air so it can follow the change of direction more easily.

A register is a grille with moving parts, capable of being opened and closed and the air flow directed, which is part of a heating, ventilation, and air conditioning (HVAC) system.

A grille is a perforated cover for an air duct (used for heating, cooling, or ventilation, or a combination thereof). Grilles sometimes have louvers which allow the flow of air to be directed. A register differs from a grille in that a damper is included. However, in practice, the terms "grille", "register", and "return" are often used interchangeably.

Referring to FIG. 1 and as described in U.S. published patent application 2016/0229265, modern motor vehicle heating, ventilation, and air-conditioning (HVAC) systems are efficient, effective mechanisms for conditioning ambient air provided to a passenger cabin of the motor vehicle, cooling or heating the air dispensed into the passenger cabin as needed. However, because vehicle HVAC systems rely on vehicle engine operation for power, operation of the HVAC system is known to reduce vehicle fuel efficiency by as much as 5-10% compared to the fuel efficiency achievable by the vehicle without the HVAC system activated. In particular, the air-conditioning components of the HVAC system reduce vehicle fuel efficiency, because a variety of HVAC elements including compressors, evaporators, forced-air blowers, etc. are required to cool air before it is dispensed into the vehicle passenger cabin. To avoid this reduction in fuel efficiency, particularly on relatively mild days the temperature of the passenger cabin can be lowered by the simple expedient of rolling one or more of the passenger cabin windows down to increase airflow through the cabin. However, the open window(s) may act as a wind scoop, reducing the aerodynamic properties of the vehicle. The increased drag created by rolling down the vehicle windows therefore likewise reduces fuel efficiency.

For that reason, modern motor vehicle HVAC systems can be operated in "vent mode," that is, configured to provide outside ambient air directly to the vehicle passenger cabin through existing register outlets 10 (FIG. 1) without actively cooling the air via the air conditioning system compressor and evaporator, etc. Vehicle HVAC systems operating in vent mode typically require operation of at least the HVAC blower to move ambient air into the passenger cabin, and so still impair vehicle fuel efficiency compared to operation of the vehicle without activation of any element of the HVAC system.

Moreover, typically the duct and vent systems of the vehicle require that the outside air pass through the entire HVAC system and air distribution system before the air passes through the register outlets 10 leading into the passenger cabin. The typical vehicle HVAC/air distribution system defines a relatively lengthy and tortuous airflow path, which in turn creates a system pressure drop that reduces the airflow volume/velocity exiting the passenger cabin register outlets 10 due to resistance to passage of air from those components. Moreover, during this passage the air absorbs heat, moisture, etc. from various HVAC system components including the evaporator-blower assembly, the heater core, and others. As a result, a time delay is created for the airflow exiting the register outlets to cool, particularly if the ambient air entering the air distribution system is already warm. As a result, at least initially air may exit the passenger cabin register outlets 10 at a higher temperature and/or humidity than the actual ambient air, contributing to passenger discomfort.

As further described in 2016/0229265, a motor vehicle HVAC and air distribution system may include at least one ambient air inlet (also referred to as a fresh air inlet) for providing ambient air from an exterior of the vehicle to the vehicle passenger cabin interior. The ambient air inlet typically includes a debris screen, and is also typically provided with a cabin air filter for removing smaller particulates from ambient air before dispensing into the passenger cabin.

Typically, the temperature and volume of air dispensed into the passenger cabin via the HVAC system are controlled. The volume of air is controlled by a blower. The air temperature is controlled by adjusting a ratio of hot air (generated by the HVAC heating elements) and cold air (generated by the HVAC cooling elements) disposed into the passenger cabin. A portion of these HVAC heating/cooling elements are generally referred to as an HVAC evaporator-blower assembly. A plenum is provided, which as is known is an air-distribution device for distributing conditioned air to various vehicle dash panel ducts. Conditioned air then passes via the panel ducts to one or more register outlets 10, and therefrom into the vehicle passenger cabin. As is also known, fans may be provided to recirculate air from the passenger cabin back through the HVAC components for additional heating or cooling, and then passed back into the passenger cabin.

Placing a vehicle HVAC system in "vent mode," allows air to be drawn into the ambient air inlet and passed into the vehicle passenger cabin without activating the vehicle HVAC heating and/or cooling elements. However, conventionally in vent mode the HVAC blower is required to move ambient air into the passenger cabin. Thus, even in vent mode ambient air must pass through the HVAC evaporator-blower assembly, where undesirable heat and/or moisture may be absorbed. Further, as summarized above, the HVAC blower relies on the vehicle engine for power, and so even in vent mode vehicle fuel efficiency is compromised.

To solve these problems, a supplemental air distribution system may be provided for cooling an interior of a motor vehicle passenger cabin, including at least one supplemental duct which directs ambient air from the ambient air inlet to the dash panel ducts/register outlets 10 by the shortest airflow path possible. Advantageously, at least one supplemental duct entirely bypasses the HVAC evaporator-blower assembly, avoiding the conventional vent mode problems of heat/moisture absorption and blower operation as summarized above. Instead, the described supplemental air distribution system relies entirely on vehicle movement to create airflow into the passenger cabin. Thus, the air is kept at a temperature close to that of the ambient air compared to conventional HVAC vent mode. In turn, a shorter airflow path is provided, reducing the airflow pressure drop experienced with conventional vent modes that direct air through all components of the HVAC and air distribution systems, and operation of the HVAC blower is not required.

Referring to FIG. 2 and as described in U.S. published patent application 2019/0168575, as is known, fully autonomous vehicles (also variously referred to as driverless vehicles, self-driving vehicles, and robotic cars) are vehicles capable via a navigation system of sensing their environment and navigating between destinations without requiring human input or control. At a high level, the navigation system typically comprises a combination of on-board and remotely located systems and/or services, and may be variously based on radar, laser light, global positioning satellite (GPS), odometry, and computer vision technologies. Autonomous vehicles further typically include control systems capable of analyzing sensory data to distinguish between different vehicles encountered on the path of travel, to allow plotting a course between locations. Fully autonomous (i.e. vehicles lacking any means of driver input) vehicle technology when fully developed and implemented will provide numerous advantages, including without intending any limitation reductions in traffic gridlock and improvements in traffic flow, including reductions in traffic collisions and associated injuries and economic cost, increased travel options for physically impaired individuals, reduced requirements for parking capacity, reductions in crime, and others.

Because no driver will be required in a fully autonomous vehicle, modifications to the current internal configuration of a vehicle passenger cabin will be possible. For example, the lack of a requirement for a steering wheel or other means of controlling the vehicle path of travel and the concomitant elimination of the requirement of a dedicated driver's seat will allow making significant changes to the current interior layout of a vehicle passenger cabin such as repositioning the vehicle seats in any way desired. In a fully autonomous vehicle, the traditional forward-facing seat arrangement may well become obsolete. Likewise, traditional "front seat" and "back seat" arrangements will likely be eliminated. In turn, elimination of traditional forward-facing front seat and back seat arrangements will result in fewer restrictions on passenger location during a trip, i.e. a passenger may begin a trip on one seat, but may choose mid-trip to simply get up and change seats. The traditional vehicle-forward dash panel could be eliminated. Likewise, the control panels, switches, knobs, etc. that are currently typically mounted in a dash panel could be replaced by centrally-located or seat-mounted control panels, switches, knobs, etc., or even by controls disposed in mobile devices such as smart phones, tablets, key fobs, smart keys, etc. carried by a passenger.

Vehicle climate control systems typically include air registers adapted to direct conditioned airflow from the vehicle heating, ventilation, and air-conditioning (HVAC) system towards a passenger. Such air registers typically include a louver or vane arrangement which may be manually or automatically adjusted to direct airflow towards a passenger occupying a vehicle seat according to the passenger's preference. Because of vehicle seating rearrangements made possible in fully autonomous vehicles, reconfiguration/repositioning of other vehicle elements such as the air registers will also likely be required. In turn, systems and methods for controlling such repositioned air registers in fully autonomous vehicles will also likely be required.

As further described with respect to FIG. 1 of 2019/0168575 (i.e. FIG. 2 herein), there is illustrated a potential interior design for an autonomous vehicle passenger. As shown, traditional "front seat" and "back seat" arrangement is replaced by vehicle seats arranged whereby passengers face one another, for convenience in interacting if desired. While four seats are shown, it will be appreciated that more or fewer seats may be included according to vehicle size, model, etc. For example, a longer vehicle could accommodate a greater number of seats. One or more air registers 12 are disposed substantially centrally in the vehicle, in the depicted embodiment being positioned in the vehicle B-pillar 14.

For purposes of this application, "Antimicrobial" is equivalent to antibacterial, antifungal, antiviral, antiparasitic, microbial, and microbistatic. Most antimicrobial agents control microorganism growth by penetrating the microorganisms thin cellular walls, thereby interrupting the organism metabolic function, and finally killing said organism.

A part having "antimicrobial properties" includes any material that kills or inhibits growth of a microorganism.

"Dispersed throughout" corresponds to the dispersal of a species, e.g. an antimicrobial agent, homogeneously or heterogeneously throughout a layer of material. For example, the antimicrobial agent may be "homogeneously dispersed" throughout a surface layer such that concentration of antimicrobial agent at the surface is substantially the same as the concentration at any other sampling location in the layer. "Heterogeneous dispersal" corresponds to more antimicrobial agent at one sampling location in the layer relative to some other sampling location in the layer. For example, there may be more antimicrobial agent at the surface relative to other sampling locations or there may be islands of more concentrated antimicrobial agent throughout the layer.

SUMMARY

An object of at least one embodiment of the present invention is to provide an antimicrobial, injection molded air duct for use in an air distribution system such as a system which delivers air to a passenger cabin in a vehicle or to an enclosed space within a residential structure.

In carrying out the above object and other objects of at least one embodiment of the present invention, an antimicrobial, injection molded air duct for use in an air distribution system which delivers air to a passenger cabin of a vehicle is provided. The air duct includes a hollow, injection molded housing having an air passageway for communicating airflow therethrough. The housing includes a layer of molded material which at least partially defines the passageway and which absorbs airborne liquid droplets containing infectious, disease-causing pathogens moving with the airflow. The molded material includes antimicrobial agents disbursed throughout the layer to reduce the number of pathogens contained within droplets absorbed by the layer.

The air duct may further include a mechanism disposed within the air passageway to adjust the volume of airflow to the passenger cabin wherein the mechanism includes a droplet-absorbing surface layer having antimicrobial properties.

The mechanism may include a damper to control airflow within the air passageway.

The air duct may further include at least one turning vane disposed within the air passageway to minimize turbulence and resistance to airflow within the passageway. The at least one turning vane may include a droplet-absorbing surface layer having antimicrobial properties.

The air distribution system may comprise an HVAC system which conditions the air provided to the passenger cabin.

The molded material may be a hydrophilic thermoplastic composition.

The antimicrobial agents may include antiviral agents.

The housing may include first and second opposed plastic parts secured to one another about their outer perimeters which allows the two parts to come together in a closed configuration in which the parts at least partially define the passageway.

The parts may be fused or welded together to secure the housing in the closed configuration.

Each of the parts may be formed as a unitary molded part having a multilayered wall structure obtained by a co-injection process during injection molding or by sandwich injection molding.

Further in carrying out the above object and other objects of at least one embodiment of the present invention, an antimicrobial, injection molded air duct for use in an air distribution system which delivers air to an enclosed space within a residential structure is provided. The air duct includes a hollow, injection molded housing having an enclosed air passageway for communicating airflow therethrough. The housing includes a layer of molded material which at least partially defines the passageway and which absorbs airborne liquid droplets containing infectious, disease-causing pathogens moving with the airflow. The material includes antimicrobial agents disbursed throughout the layer to reduce the number of pathogens contained within droplets absorbed by the layer.

The air duct may further include a mechanism disposed within the air passageway to adjust the volume of airflow to the enclosed space wherein the mechanism includes a droplet-absorbing surface layer having antimicrobial properties.

The mechanism may include a damper to control airflow within the air passageway.

The air duct may further include at least one turning vane disposed within the air passageway to minimize turbulence and resistance to airflow within the passageway. The at least one turning vane may include a droplet-absorbing surface layer having antimicrobial properties.

The air distribution system may comprise an HVAC system which conditions the air provided to the enclosed space.

The molded material may be a hydrophilic thermoplastic composition.

The antimicrobial agents may include antiviral agents.

The housing may include first and second opposed plastic parts secured to one another about their outer perimeters which allow the two parts to come together in a closed configuration in which the parts at least partially define the passageway.

The parts may be fused or welded together to secure the housing in the closed configuration.

Each of the parts may be formed as a unitary molded part having a multi-layered wall structure obtained by a co-injection process during injection molding or by sandwich injection molding.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 8:
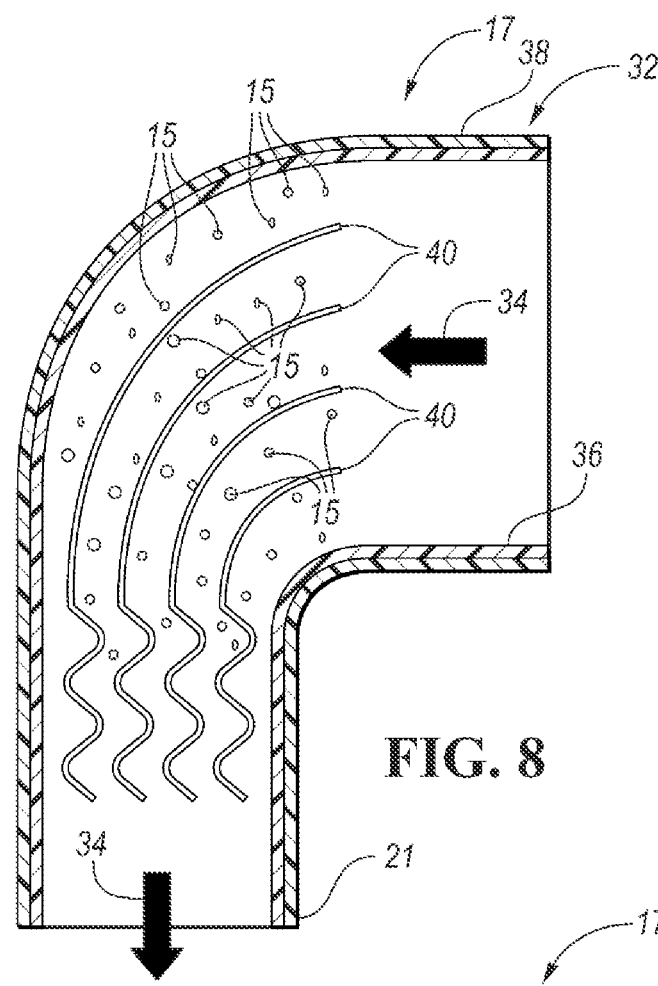
FIG. 8 is a top plan view, partially broken away and in cross-section, of a prior art air duct with turning vanes which has been modified.
Figure 9:
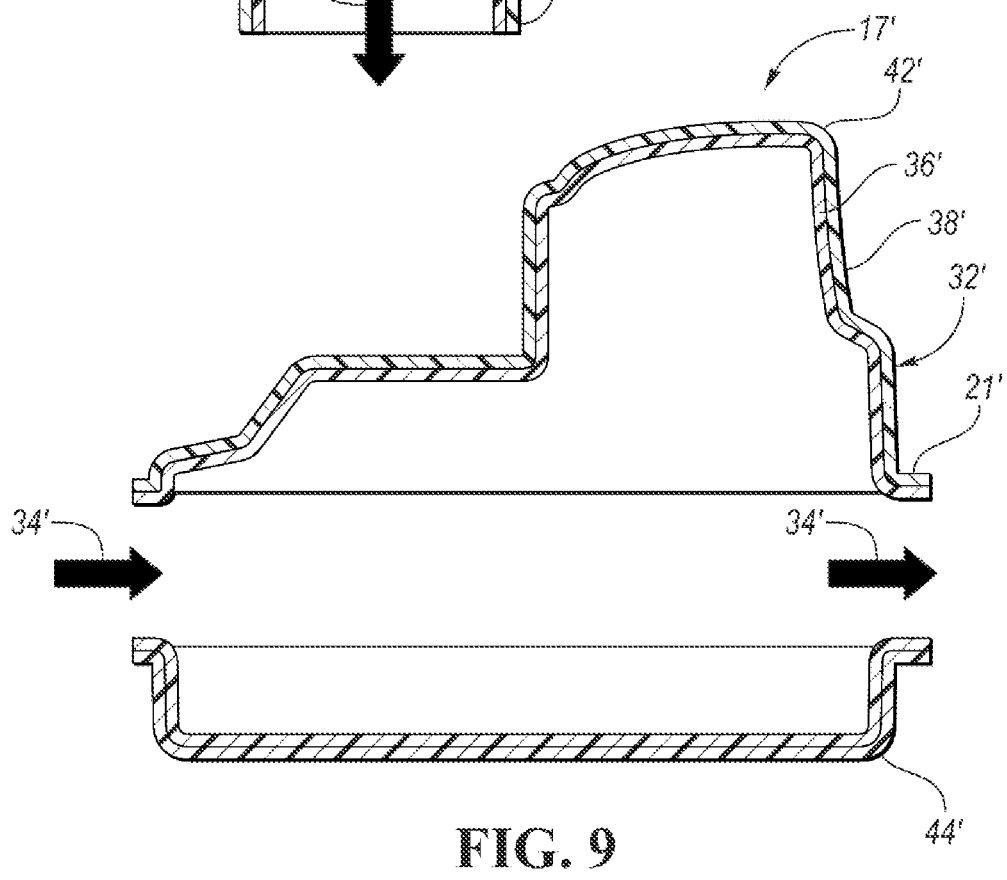
FIG. 9 is an exploded view, partially broken away and in cross-section, of a prior art air duct which has been modified.

An antimicrobial, injection molded air register, generally indicated at 16 and 16' in FIGS. 3-4 and 5-7, respectively, for use in an air distribution system such as an HVAC system is used to direct airflow from ductwork, generally indicated at 17 and 17' in FIGS. 8 and 9, respectively, into a passenger cabin of a vehicle or into an enclosed space within a residential structure. Each air register 16 or 16' includes a perforated cover 19 or 19', respectively, configured to cover an outlet end 21 or 21' of the ductwork 17 or 17', respectively, and a plurality of injection molded components such as adjustable louvers or vanes 18 or 18' configured to distribute the airflow into desired directions into the passenger cabin or enclosed space. The louvers or vanes 18 or 18' are supported by the cover 19 or 19', respectively, to direct air flow into the passenger cabin.

Each of the components 18 or 18' includes one or more surface layers 20 or 20', respectively, in fluid communication with the airflow and is made of a molded material which absorbs airborne liquid droplets 15 (exaggerated in size in FIG. 8) containing infectious, disease-causing pathogens moving with the airflow. The molded material includes antimicrobial agents disbursed throughout each of the surface layers 20 or 20' to reduce the number of pathogens contained within the droplets 15 absorbed by the surface layers 20 or 20'.

The molded material is preferably generally of the type disclosed in U.S. Published Patent Application No. 2019/0352446 and can be characterized as a hydrophilic thermoplastic composition having antimicrobial agents such as antiviral agents.

The air register 16 or 16' may further include a damper 24 or 24' respectively, to control the volume of airflow into the passenger cabin. The damper 24 or 24' may also include one or more droplet-absorbing surface layers 26 or 26', respectively, having antimicrobial properties. The air register 16' may also include an injection molded air register inlet 28' having an air passageway for communicating air flow towards the cover 19' as indicted by arrows 29'. The air register inlet 28' also includes a droplet absorbing, inner surface layer 30' having antimicrobial properties.

The air ducts 17 and 17' are antimicrobial, injection molded air ducts for use in the air distribution system. The air duct 17 or 17' includes a hollow, injection molded housing, generally indicated at 32 and 32', respectively, having an air passageway for communicating airflow (as indicated by arrows 34 and 34') therethrough. The housing 32 or 32' includes an inner layer 36 or 36', respectively, of molded material which at least partially defines the passageway and which absorbs airborne liquid droplets 15 (exaggerated in size in FIG. 8) containing infectious, disease-causing pathogens moving with the airflow. The molded material includes antimicrobial agents disbursed throughout the layer 36 or 36' to reduce the number of pathogens contained within droplets 15 absorbed by the layer 36 or 36'. The housing 32 or 32' also includes an outer layer 38 or 38', respectively, made of a molded material compatible with the molded material of the inner layer 36 or 36'.

As with the layers 20, 20', 26, 26' and 30' of the air registers 16 and 16' of FIGS. 3-4, and 5-7, respectively, the molded material of the layers 36 and 36' of the air ducts 17 and 17', respectively, is generally of the type disclosed in U.S. Published Patent Application No. 2019/0352446. Again, the molded material can be characterized as a hydrophilic thermoplastic composition having antimicrobial agents such as antiviral agents.

Figure 1:
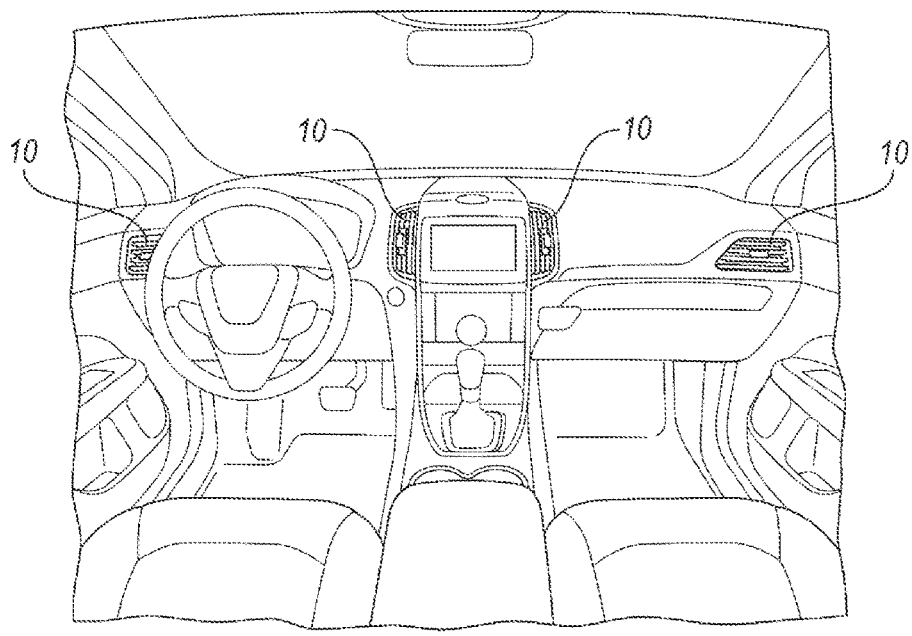
FIG. 1 is a front perspective environmental view, partially broken away, of a prior art front dashboard and console within an automotive vehicle HVAC system.
Figure 2:
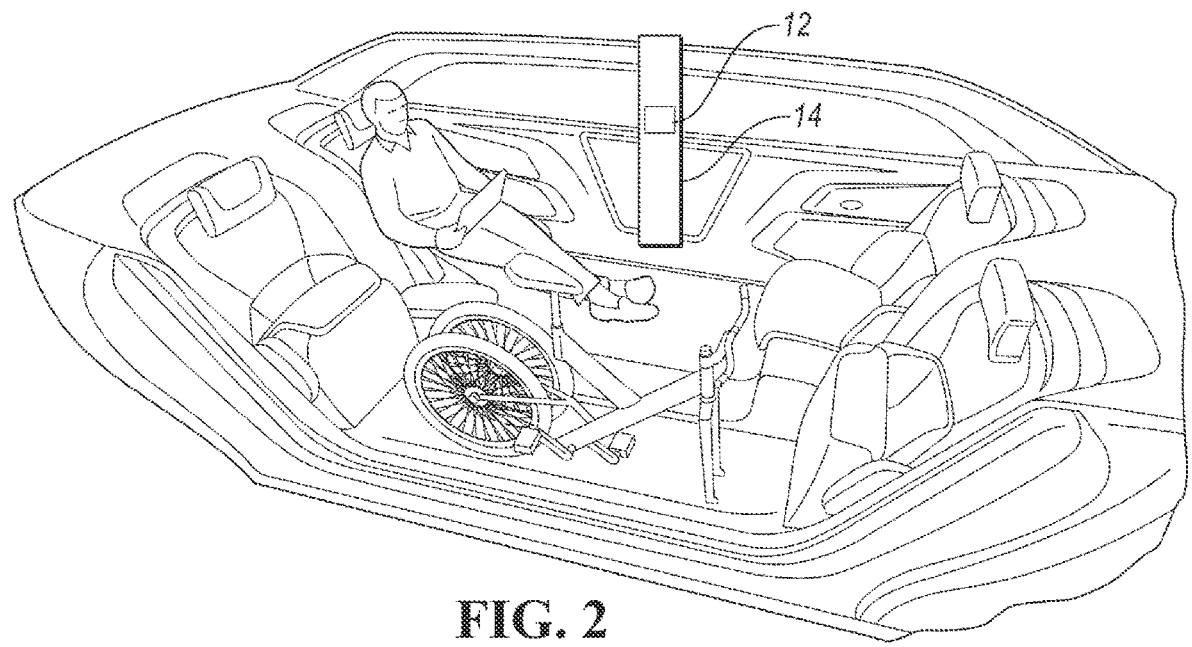
FIG. 2 is a side perspective environmental view, partially broken away, of a prior art passenger cabin of an autonomous vehicle.
Figure 3:
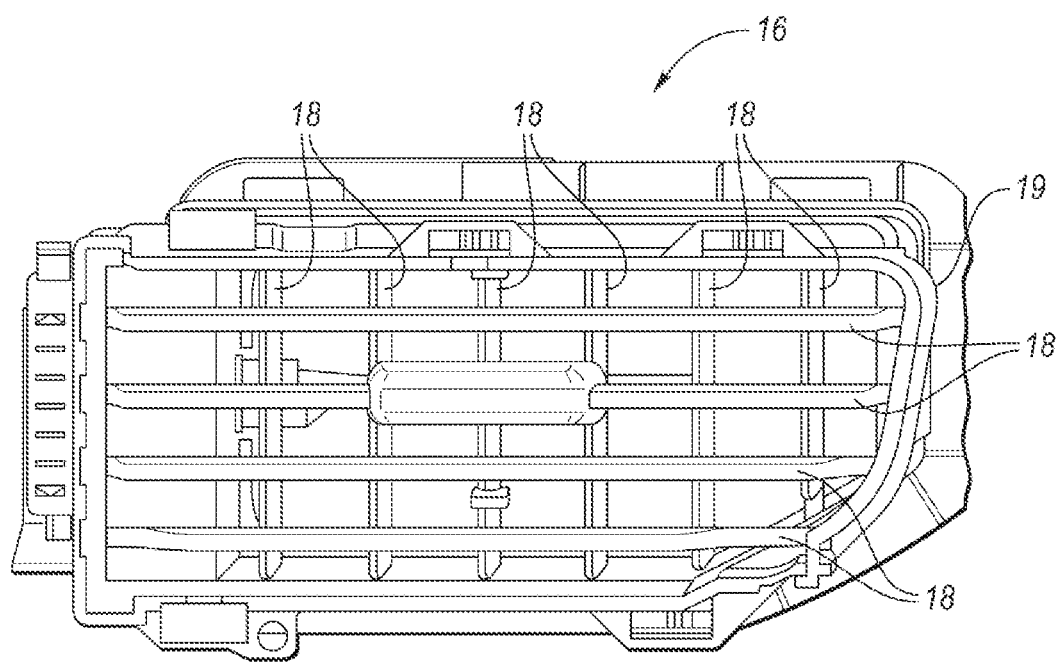
FIG. 3 is a front schematic view of a prior art air register which has been modified for use in a vehicle HVAC system.
Figure 4:
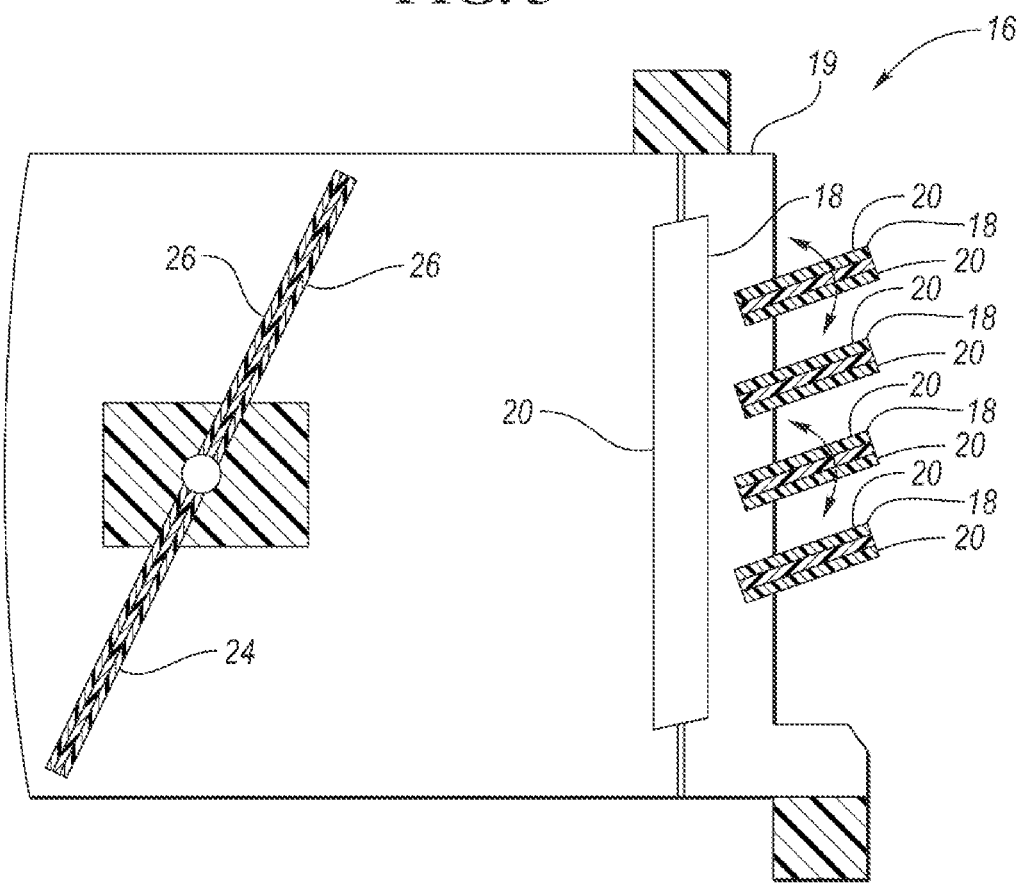
FIG. 4 is a side schematic view of a prior art mechanism for controlling the volume of airflow in the passenger cabin via the air register of FIG. 3 and which has been modified.
Figure 5:
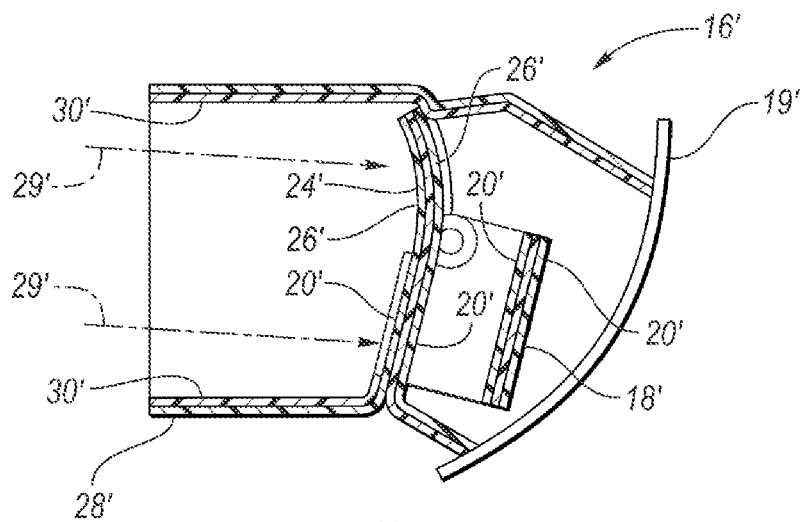
FIG. 5 is a side, schematic view, partially broken away and in cross section, of a prior art air vent damper apparatus which has been modified and with its damper door shown in a closed, down position.
Figure 6:
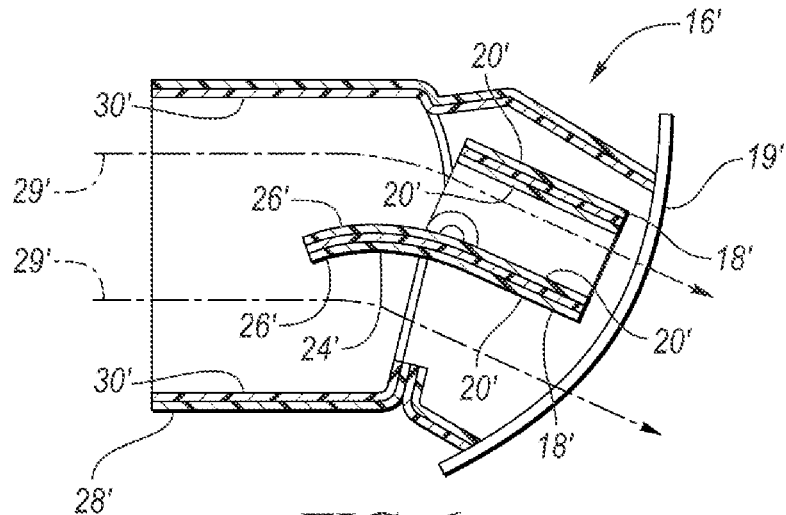
FIG. 6 is a view similar to the view of FIG. 5 with the prior art door which has been modified in an intermediate position.
Figure 7:
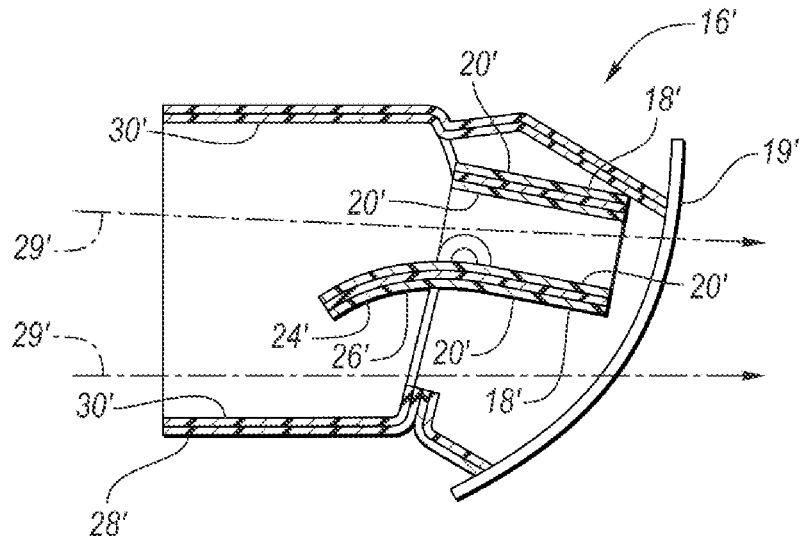
FIG. 7 is a view similar to the views of FIGS. 5 and 6 with the prior art door which has been modified in a fully open position.

The air duct 17 or 17' may further comprise a mechanism such as a damper generally of the type shown in FIG. 4 at reference number 24 to control airflow within the air passageway. The mechanism is disposed within the air passageway to adjust the volume of airflow to the passenger cabin or enclosed space. The mechanism may include one or more droplet-absorbing surface layers such as the layers 26 having antimicrobial properties.

The air duct 17 or 17' may further comprise one or more turning vanes 40 disposed within the air passageway to minimize turbulence and resistance to airflow within the passageway. The turning vanes 40 may include a droplet-absorbing surface layer having antimicrobial properties as described above or may be completely made of such molded material.

As shown in FIG. 9, the housing 32' may include first and second opposed plastic parts 42' and 44' secured to one another about their outer perimeters which allows the two parts 42' and 44' to come together in a closed configuration in which the parts 42' and 44' at least partially define the passageway.

The parts 42' and 44' may be fused or welded together to secure the housing 32' in the closed configuration.

Each of the parts 42' and 44' may be formed as a unitary molded part having a multilayered wall structure (i.e. the layers 36' and 38') obtained by a co-injection process during injection molding or by sandwich injection molding.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An antimicrobial, injection molded air duct for use in an air distribution system which delivers air to a passenger cabin of a vehicle, the air duct comprising:
    a hollow, injection molded housing having an air passageway configured to communicate airflow therethrough, the housing including an outer layer of molded material and a droplet-absorbing, inner surface layer of molded material compatible with the molded material of the outer layer, wherein the inner surface layer of the housing completely defines the air passageway and extends the full length of the air passageway between inlet and outlet ends of the air duct and which absorbs airborne liquid droplets containing infectious, disease-causing pathogens moving with the airflow, wherein the molded material of the inner surface layer includes antimicrobial agents dispersed throughout the inner surface layer to reduce the number of pathogens contained within liquid droplets absorbed by the inner surface layer; and
    a turning vane disposed within the air passageway to direct a change in direction of the airflow within the air passageway, wherein the turning vane includes a droplet-absorbing surface layer having antimicrobial properties to absorb, from the airflow impacting the turning vane when being changed in direction by the turning vane, airborne liquid droplets containing infectious, disease-causing pathogens moving with the airflow, the surface layer of the turning vane including antimicrobial agents to reduce the number of pathogens within liquid droplets absorbed by the surface layer of the turning vane.

2. The air duct as claimed in claim 1, further comprising a mechanism disposed within the air passageway to adjust a volume of airflow to the passenger cabin wherein the mechanism includes a droplet-absorbing surface layer having antimicrobial properties.

3. The air duct as claimed in claim 2, wherein the mechanism includes a damper to control airflow within the air passageway.

4. The air duct as claimed in claim 1, wherein the air distribution system comprises an HVAC system which conditions the air provided to the passenger cabin.

5. The air duct as claimed in claim 1, wherein the molded material of the inner layer is a hydrophilic thermoplastic composition.

6. The air duct as claimed in claim 1, wherein the antimicrobial agents include antiviral agents.

7. The air duct as claimed in claim 1, wherein the housing includes first and second opposed plastic parts secured to one another about their outer perimeters in a closed configuration in which inner surface layers of the parts completely define the passageway.

8. The air duct as claimed in claim 7, wherein the parts are fused or welded together to secure the housing in the closed configuration.

9. The air duct as claimed in claim 7, wherein each of the parts is formed as a unitary molded part having a multilayered wall structure obtained by a co-injection process during injection molding or by sandwich injection molding.

10. The air duct as claimed in claim 1, wherein a portion of the turning vane is wavy to increase impact events of the airflow with the turning vane to thereby increase opportunity for the surface layer of the turning vane to absorb airborne liquid droplets containing infectious, disease-causing pathogens moving with the airflow.

11. An antimicrobial, injection molded air duct for use in an air distribution system which delivers air to an enclosed space within a residential structure, the air duct comprising:
    a hollow, injection molded housing having an enclosed air passageway configured to communicate airflow therethrough, the housing including an outer layer of molded material and a droplet-absorbing, inner surface layer of molded material compatible with the molded material of the outer layer wherein the inner surface layer of the housing completely defines the air passageway and extends the full length of the air passageway between inlet and outlet ends of the air duct and which absorbs airborne liquid droplets containing infectious, disease-causing pathogens moving with the airflow, wherein the molded material of the inner surface layer includes antimicrobial agents dispersed throughout the inner surface layer to reduce the number of pathogens contained within droplets absorbed by the inner surface layer; and
    a turning vane disposed within the air passageway to direct a change in direction of the airflow within the air passageway, wherein the turning vane includes a droplet-absorbing surface layer having antimicrobial properties to absorb, from the airflow impacting the turning vane when being changed in direction by the turning vane, airborne liquid droplets containing infectious, disease-causing pathogens moving with the airflow, the surface layer of the turning vane including antimicrobial agents to reduce the number of pathogens within liquid droplets absorbed by the surface layer of the turning vane.

12. The air duct as claimed in claim 11, further comprising a damper disposed within the air passageway to control airflow within the air passageway, wherein the damper includes a droplet-absorbing surface layer having antimicrobial properties.

13. The air duct as claimed in claim 11, wherein the air distribution system comprises an HVAC system which conditions the air provided to the enclosed space.

14. The air duct as claimed in claim 11, wherein the molded material of the inner surface layer is a hydrophilic thermoplastic composition.

15. The air duct as claimed in claim 11, wherein the housing includes first and second opposed plastic parts secured to one another about their outer perimeters in a closed configuration in which inner layers of the parts completely define the passageway.

16. The air duct as claimed in claim 15, wherein each of the parts is formed as a unitary molded part having a multilayered wall structure obtained by a co-injection process during injection molding or by sandwich injection molding.

17. The air duct as claimed in claim 11, wherein a portion of the turning vane is wavy to increase impact events of the airflow with the turning vane to thereby increase opportunity for the surface layer of the turning vane to absorb airborne liquid droplets containing infectious, disease-causing pathogens moving with the airflow.

* * * * *